US005544032A

United States Patent [19]

Mimura

[11] Patent Number: 5,544,032
[45] Date of Patent: Aug. 6, 1996

[54] SWITCHING POWER SUPPLY

[75] Inventor: Hiroshi Mimura, Nagaoka, Japan

[73] Assignee: Nemic-Lambda Kabushiki Kaisha, Japan

[21] Appl. No.: 422,635

[22] Filed: Apr. 14, 1995

Related U.S. Application Data

[63] Continuation of Ser. No. 130,262, Oct. 1, 1993, abandoned.

[30] Foreign Application Priority Data

Oct. 1, 1992 [JP] Japan ................................. 4-263822

[51] Int. Cl.⁶ ............................................. H02M 3/335
[52] U.S. Cl. ................................. 363/16; 363/21
[58] Field of Search ......................... 363/16–21, 50, 363/51, 55, 56, 74, 75, 78, 80, 97, 131

[56] References Cited

U.S. PATENT DOCUMENTS

| | | | |
|---|---|---|---|
| 4,056,693 | 11/1977 | Bosik et al. | 363/16 |
| 4,612,610 | 9/1986 | Farnsworth et al. | 363/26 |
| 4,754,385 | 6/1988 | McDade et al. | 363/16 |
| 4,939,633 | 7/1990 | Rhodes et al. | 363/98 |
| 4,952,819 | 8/1990 | Herrmann | 307/282 |
| 4,956,761 | 9/1990 | Higashi | 363/19 |
| 5,036,452 | 7/1991 | Loftus | 363/71 |
| 5,172,308 | 12/1992 | Tohya | 363/16 |
| 5,233,287 | 8/1993 | Lenk | 363/16 |

FOREIGN PATENT DOCUMENTS

| | | | |
|---|---|---|---|
| 123030 | 10/1984 | European Pat. Off. | H02M 3/335 |
| 435460 | 7/1991 | European Pat. Off. | |
| 2921910 | 12/1980 | Germany. | |
| 61-231875 | 6/1986 | Japan | H02M 3/28 |
| WO85/04059 | 9/1985 | WIPO. | |

OTHER PUBLICATIONS

Patent Abstracts of Japan JP-A-03 178 555 (Matsushita Electric Ind. Co.) 2 Aug. 1991, vol. 15, No. 428 (E-1128) 30 Oct. 1991.

Patent Abstracts of Japan JP-A-01 194 862 (TDK Corp.) 4 Aug. 1989, vol. 13, No. 490 (E-841) 7 Nov. 1989.

Database WPI Section EI, Week 8431, Derwent Publications Ltd., London, GB; Class S, AN 84-194104 Y. U. Kashitsin et al. "Current Sensor" & SU-A-1 057 788 (Relay Eng. Res. Des. C.) 30 Nov. 1983.

Primary Examiner—Matthew V. Nguyen
Attorney, Agent, or Firm—Quarles & Brady

[57] ABSTRACT

Disclosed is a switching power supply which can realize the saving of space and low-cost manufacturing. On-off control of FET (3), intermittently applies D.C. input voltage V-IN to the primary windings (1A, 2A), of transformers (1,2). Current detection circuit (15) detects the voltage drop caused by the resistance of the secondary windings (1B,2B) to produce output current detection signals in proportion to the load current (1D). The resistance of the secondary windings (1B,2B) of transformers (1,2) can be employed as a current detector, whereby saving of space and low-cost manufacturing of power supplies can be realized.

8 Claims, 4 Drawing Sheets

SWITCHING POWER SUPPLY

This is a continuation of application Ser. No. 08/130,262, filed Oct. 1, 1993 (now abandoned).

BACKGROUND OF THE INVENTION (a) Field of the Invention

The present invention relates to Switching Power Supply equipped with current detection circuits both for protection against excess current and current sharing function in parallel operation.

(b) Description of Prior Art

In general, conventional Switching Power Supply for stabilizing D.C. output voltage by switching elements thereof is coupled with excess current protective circuitry for suppressing the secondary excess current of a transformer in a overload condition. On the other hand, in the event of parallel operation of multiple Switching Power Supplies, it is desirable, for reliability's point of view, that a current sharing function may be integrated therewith in order to equalize load current from each Power Supply. For the aforementioned excess current protective circuitry and current sharing function, current detection circuit is indispensable to monitor the secondary output load current of a transformer, which, for example, is disclosed in Japanese Patent Application Laid-open No. 61-231875.

Said Japanese Patent Application discloses such circuit arrangements that between the primary or secondary lines of a transformer is interposed a current detector such as a resistor or a current transformer, and the current flowing therethrough is supplied to a current detection circuit to output current detection signals in proportion to load current thereof.

However, the above conventional art has a few problems described below;

First, in the event of using a resistor as a current detector, power consumption by said resistor itself causes the large loss of said Power Supply itself. Secondly, specifically in the case of Power Supply with a large output current, the current flowing through the resistor also increases, thus such resistor requires larger permissible power capacity, which prevents the saving of space of Power Supply.

On the other hand, in the event of using a current transformer as a current detector, said loss of Power Supply becomes less than using a resistor, however, Power Supply for Super Power needs a large transformer as well as in using said resistor, which prevents the space saving and low-cost manufacturing of Power Supply.

SUMMARY OF THE INVENTION

Accordingly, it is the main object of the present invention to provide Switching Power Supply which can realize the saving of space even for a larger output current.

It is another object of the present invention to provide Switching Power Supply which can realize low-cost manufacturing even for a larger output current.

In accordance with a major feature of the present invention, there is provided a structure for Switching Power Supply comprising:

one or more transformers isolated between the primary side and secondary side thereof;

switching elements for on-off control of D.C. input voltage applied to the primary winding of said transformer;

one or more current detection circuits to output current detection signals in proportion to the secondary load current of the transformer, detecting voltage drop caused by the secondary winding resistance of said transformer.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF A PREFERRED EMBODIMENT

Hereinafter is explained a first embodiment of the invention with reference to FIGS. 1 to 5.

Figure 1:
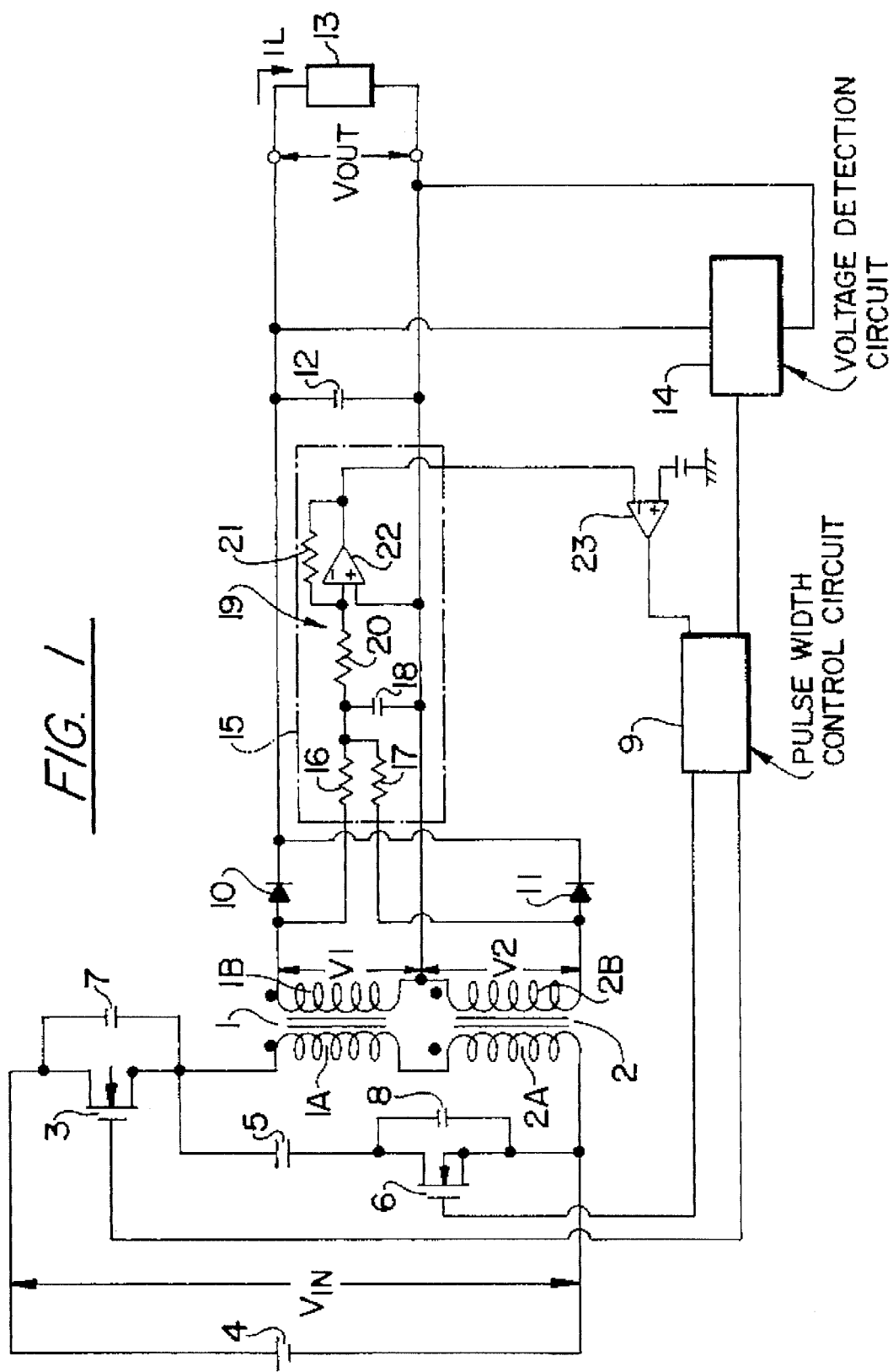
FIG. 1 is a circuit diagram showing the first embodiment of a Switching Power Supply of the invention.
Figure 2:
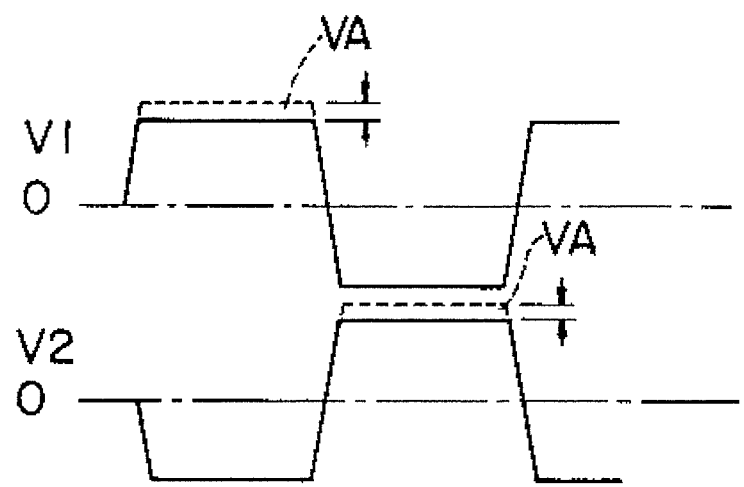
FIG. 2 is a waveform illustrating the primary and secondary voltage of a transformer of the invention.

In FIGS. 1 and 2 showing a first embodiment of the invention, reference numerals 1 and 2 designate transformers, of which the primary and secondary sides are isolated, wherein the primary windings 1A and 2A are connected in series, while the secondary windings 1B and 2B are connected in series respectively. Said primary windings 1A and 2A are connected in series to D.C. power supply 4 via a switching element or MOS FET 3 in order to apply D.C. input voltage V-IN thereto. Further, series circuit of a blocking capacitor 5 and switching element or MOS FET 6 is connected in parallel with said series circuit of said primary windings 1A,2A.

Between each drain and source of said FETS 3,6 are provided capacitors 7,8 having discrete inherent capacitances. Although not shown in FIGS, each FET is integrated with body diodes therein, and driving signals from pulse width control circuit 9 are alternately supplied to discrete gates of FETS 3,6, so that output voltage V-OUT can be held constant by controlling pulse width of said driving signals.

On the other hand, the voltage V1,V2 induced in the secondary windings 1B,2B of transformers 1,2 are rectified by rectifier circuit of center-tap type fabricated by connecting diodes 10,11 to said secondary windings 1B,2B respectively. After that, said voltage V1,V2 are smoothed by smoothing capacitor 12 to be supplied to load 13 as D.C. output voltage V-OUT. Incidentally, reference numeral 14 designates voltage detection circuit connected to opposite terminals of said smoothing capacitor 12, which supplies detected voltage to pulse width control circuit 9, corresponding to variation of said D.C. output voltage V-OUT.

Reference numeral 15 designates current detection circuit for protection against excess current provided on the secondary sides of transformers 1,2. Said current detection circuit 15 detects voltage drop in the secondary windings 1B,2B of transformers 1,2 in order to output current detection signals in proportion to the secondary load current iL of transformers 1,2. In other words, to the connection points of the secondary winding 1B with diode 10 and the secondary winding 2B with diode 11 are connected respectively one of terminals of resistors 16,17, while the other terminal thereof are connected to each other. Further, between said other terminal of resistors 16,17 and the connection point of the secondary windings 1B and 2B is interposed capacitor 18 to form filter circuit comprising resistors 16,17 and capacitor 18. Reference numeral 19 designates conventional amplifier circuit comprising resistors 20,21 and operational amplifier 22, which amplifies output signals from said filter circuit at predetermined amplification factor defined by said resistors 20,21 to output the same as current detection signals.

Said current detection signals from current detection circuit 15 is supplied to negative input terminal of the operational amplifier 23, while predetermined reference voltage is applied to the positive input terminal thereof, thus higher electric potential of current detection signals compared to said reference voltage permits the output terminal of said operational amplifier 23 to supply High-level control signals to pulse width control circuit 9. And said control signals force pulse width control circuit 9 to narrow the pulse width of the driving signals to each FET 3, in order to limit load current iL.

Hereinafter is described the action of the structure thus far described.

First, FET 3 is on-off controlled by means of driving signals from pulse width control circuit 9 on the primary sides of transformers 1,2, whereby D.C input voltage V-IN is intermittently applied to the primary windings 1A,2A of transformers 1,2.

On the other hand, FET 6 is turned-on/off alternately with respect to FET 3, while each FETs 3,6 is so controlled that there exists certain dead band in changing over from switching-on to switching-off of each FETs 3,6.

At this time, driving signals from pulse width control circuit 9 is supplied in order that capacitor 7 may be discharged by accumulated energy in the primary windings 1A,2A of transformers 1,2 prior to turning-on of FET 3, while capacitor 8 may be discharged by accumulated energy in the primary windings 1A,2A of transformers 1,2 prior to turning-on of FET 6, whereby switching loss can be minimum to attain so called "Zero-Voltage Switching".

With the above serial action of FETS 3,6, the voltage induced in the secondary windings 1B,2B is rectified and smoothed by diodes 10,11 and smoothing capacitor 12 to supply predetermined D.C output voltage V-OUT to load 13. And pulse width control circuit 9 controls the pulse width of driving signals supplied to each FETS 3,6 with reference to detected voltage from voltage detection circuit so that said D.C. output voltage V-OUT will be held constant.

On the other hand, at the both terminals of the secondary windings 1B,2B of transformers 1,2 symmetrically emerge output voltage V1,V2 having such waveforms as shown in FIG. 2 respectively. At this time, electrical nature of transformers 1,2 shows that products of output voltage V1 and time, output voltage V2 and time in turning-on of FET 3 are respectively equal to those in turning-off of FET 3. However, winding resistance in each secondary windings 1B,2B causes voltage drop VA when electric current flows through said secondary windings 1B,2B.

That is to say, if the output voltage V1,V2 are negative, current supply to load 13 is interrupted by diodes 10,11, thus no electric current flows through said secondary windings 1B,2B, therefore, no voltage drop caused by the resistance therein occur. On the other hand, if the output voltage V1,V2 are positive, current supply to load 13 is permitted by diodes 10,11, thus electric current flows through said secondary windings 1B,2B, whereby voltage drop will occur in proportion to load current iL at both terminals of the secondary windings 1B, 2B.

In order to detect said voltage drop VA caused in each secondary windings 1B,2B, the current detection circuit 15 eliminates such signals included within a switching frequency region from each output voltage V1,V2 by means of said filter circuit comprising resistors 16,17 and capacitor 18, whereby only the D.C. signals corresponding to said voltage drop VA is supplied to amplifier circuit 19. Thereafter, said amplifier circuit 19 amplifies said D.C. signals from said filter circuit in order to obtain current detection signals in proportion to load current iL.

In accordance with the structure of the present embodiment, said current detection signals can be utilized for protection against excess current. That is, if load current iL exceeds predetermined value because of, for example, short-circuiting of load 13, electric potential of said current detection signals is also to become high in proportion to said load current iL. Therefore, High-Level control signals from said operational amplifier 23 will be output to said pulse width control circuit 9, which immediately narrows the pulse width of driving signals to FET 3 in order to limit the supply to load current iL.

As hereinbefore described, the present embodiment employs the winding resistance in the secondary windings 1B,2B of transformers 1,2 as current detector, so that load current iL can be monitored by means of the voltage drop caused in said secondary windings 1B,2B. Accordingly, conventional resistors or transformers for detection of electric current are no longer necessary, and as a result, parts can be saved. Especially, the present embodiment enables Large-Power Power Supply to easily realize the saving of space and low-cost manufacturing thereof. Further, said current detection circuit 15 detects the current in the secondary windings 1B,2B of transformers 1,2, of which the detection is approximately equal to direct detection of load current iL. Therefore, constant current/voltage drooping characteristic can be easily obtained in utilizing said current detection circuit 15 for protection against excess current.

Figure 3:
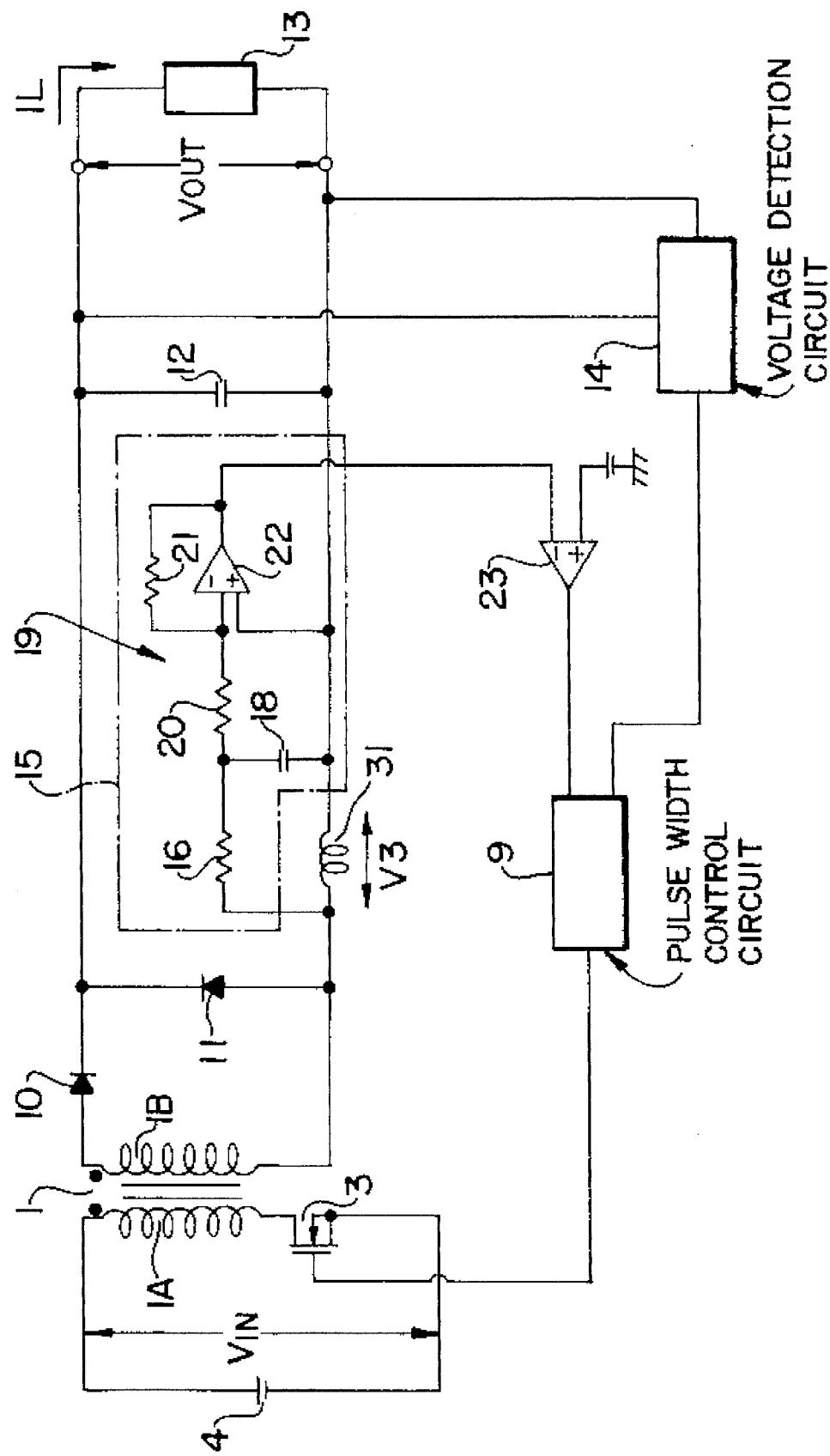
FIG. 3 is a circuit diagram showing the first embodiment of a Switching Power Supply of the invention.

Hereinafter is explained a second embodiment with reference to FIGS. 3,4, in which the same portions as those of the first embodiment are designated as common reference numerals, and their repeated detail description will be omitted.

The present embodiment relates to so called Forward switching Power Supply, in which on-off control of FET 3 allows D.C. input voltage V-IN to be intermittently applied to the primary winding 1A of transformer 1, and the voltage induced in the secondary winding 1B of said transformer 1 is rectified and smoothed by means of diodes 10,11, capacitor 12, and choking coil 31, whereby D.C. output voltage V-OUT can be supplied to load 13. And the connection point of said choking coil 31 and secondary winding 1B of transformer 1 is further connected to resistor 16 of current detection circuit 15.

Figure 4:
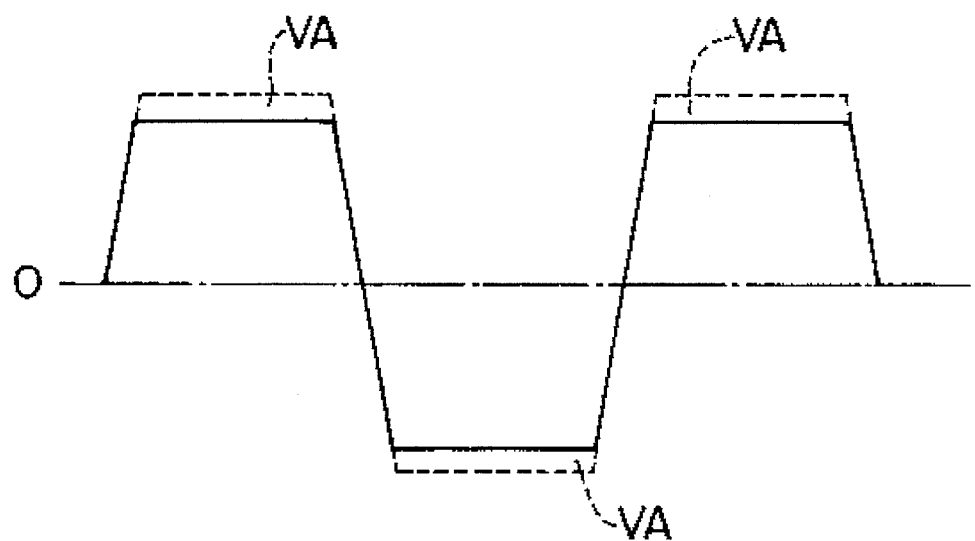
FIG. 4 is a waveform illustrating the primary and secondary voltage of a transformer of the second embodiment of the invention.

At both terminals of choking coil 31 emerges terminal voltage V3 having such waveform as shown in FIG. 4 in accordance with on-off control of FET 3. At this time, winding resistance in said choking coil 31 itself causes voltage drop VA in proportion to load current iL in turning-on/off of said FET 3, thus terminal voltage V3 including said voltage drop VA is detected by current detection circuit 15, whereby current detection signals can be output to operational amplifier 23 to attain the same action and effect as those of the first embodiment.

Figure 5:
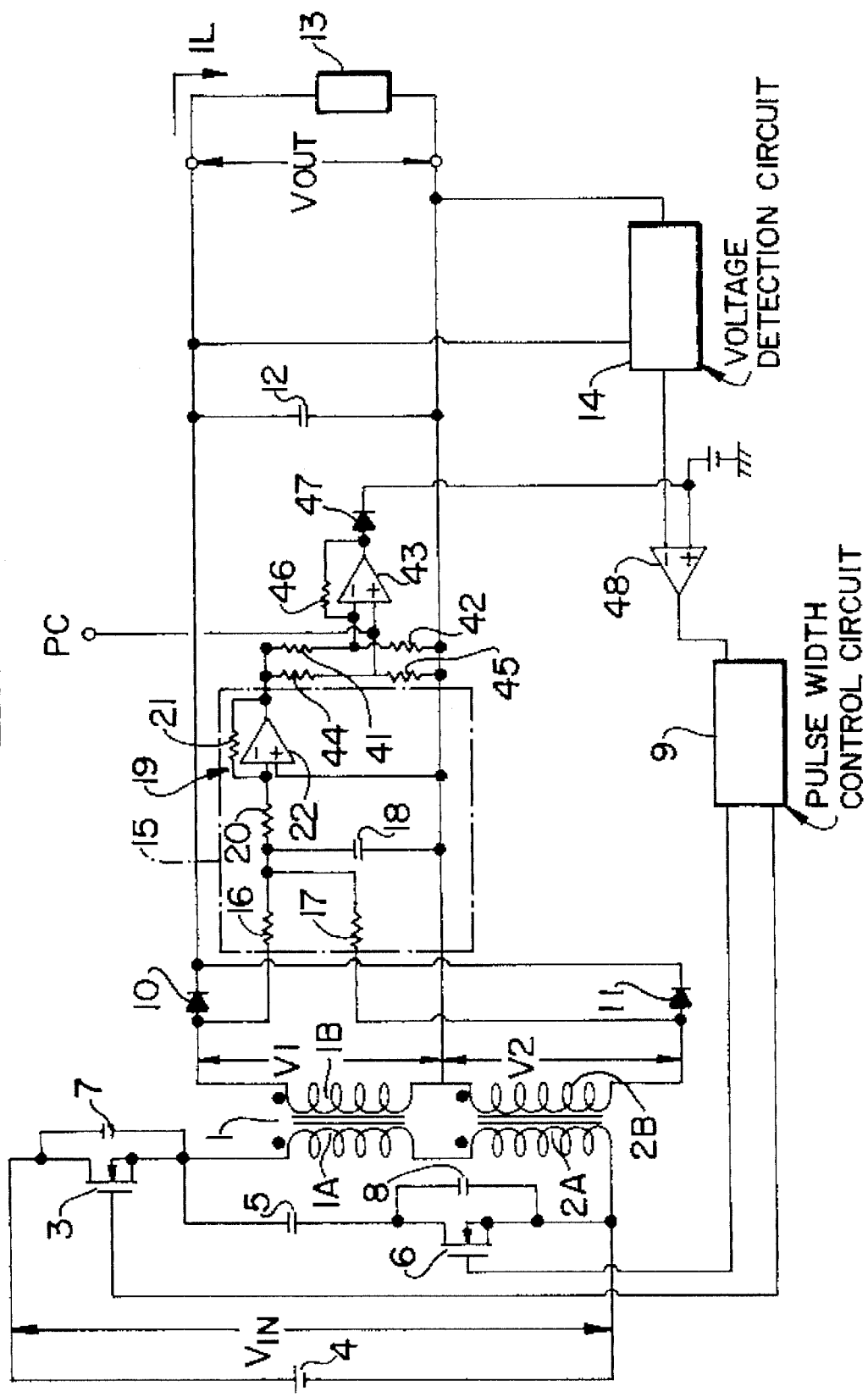
FIG. 5 is a circuit diagram showing the third embodiment of a Switching Power supply of the invention.

In FIG. 5 showing a third embodiment of the invention, current sharing function is applied to said Switching Power Supply. Again, the same portions as those of the forgoing embodiments are designated as common reference numerals, and their repeated detail description will be omitted.

The current detection signals from said current detection circuit 15 is devided by resistors 41,42 to be supplied to negative input terminal of the operational amplifier 43. On the other hand, to the positive input terminal of said operational amplifier 43 is connected current sharing terminal PC and is supplied said current detection signals devided by resistors 44,45. Further, between the negative terminal and output terminal of said operational amplifier 43 is interposed resistor 46, while said output terminal of operational amplifier 43 is connected via diode 47 to the positive terminal of operational amplifier 48, to which is supplied reference voltage. Additionally, to the negative input terminal of said operational amplifier 48 are supplied detection signals from voltage detection circuit 14, while the output terminal thereof is connected to pulse width control circuit 9.

Since each Power Supply device allows the current detection circuit 15 integrated therewith to output current detection signals in proportion to load current iL thereof, the electric potential at said current sharing terminal PC varies depending upon the variation of said load current iL. Therefore, in the case of single operation, such Power Supply having smaller load current iL has corresponding smaller electric potential at its current sharing terminal PC as compared with that of such Power Supply having larger load current iL, On the other hand, in the case of parallel operation, as each current sharing terminal of each Power Supply device is connected to one another, the potential at current sharing terminal PC of such Power Supply with smaller load current iL inevitably rises, whereas the electric potential at current sharing terminal PC of such Power Supply with larger load current iL inevitably falls.

Accordingly, each Power Supply having smaller load current iL permits the electric potential at the positive input terminal of operational amplifier 43 to rise, thus the output terminal of said operational amplifier 43 becomes High so as to raise the potential at the positive input terminal provided on the reference voltage side of operational amplifier 48.

On the other hand, each Power Supply having larger load current iL allows the potential at the positive input terminal of operational amplifier 43 to inevitably fall, thus the output terminal of said each operational amplifier 43 becomes Low-Level, nevertheless, current flow from the reference voltage into operational amplifier 43 is interrupted by diode 47 so that the electric potential of reference voltage is held constant at the positive input terminal of said operational amplifier 48.

Constantly, each Power Supply having smaller load current iL permits the reference potential of operational amplifier 48 to rise, whereby pulse width control circuit 9 can control the driving signals to each FET 3,6 in order to permit more load current iL to flow thereinto in accordance with the output signals from said operational amplifier 48.

Incidentally, the present invention should not be limited to the aforementioned embodiments thus far described, but can be modified within the scope of the invention.

For example, besides Zero-Voltage-Switching or Forward Switching Power Supply, the present invention may be applied to Push and Pull or Pull Bridge Switching Power Supply. Further, current detection signals from current detection circuit may be utilized for such functions other than for said protection against excess current or current sharing.

What is claimed:

1. A switching power supply comprising:

at least one transformer having primary and secondary windings isolated from each other;

one or more switching elements for on-off control of D.C. input voltage applied to said primary winding;

said at least one transformer inducing a D.C. output voltage for a load connected to the secondary winding in response to the D.C. input voltage applied to the primary winding, said secondary winding having a winding resistance; and a detection circuit for sensing current flow in said secondary winding without the need for a separate current-sensing element, said detection circuit connected to one terminal of the secondary winding for detection of a voltage drop which is proportional to the load current and which is caused by the winding resistance of the secondary winding in association with operation of the switching elements, said detection circuit detecting the voltage drop from one terminal of the secondary winding to produce output current detection signals through a filter network non-magnetically coupled therewith for rejection of signals within a switching frequency region from the output voltage induced in the secondary winding.

2. A switching power supply according to claim 1, further comprising a pulse width control circuit supplying driving signals to said one or more switching elements to hold the D.C. output voltage constant, said pulse width control circuit forcedly narrowing pulse widths of the driving signals in order to limit the supply of load current when the output current detection signals reach at least a predetermined level.

3. A switching power supply comprising:

at least one transformer having primary and secondary windings isolated from each other;

one or more switching elements for on-off control of D.C. input voltage applied to said primary winding;

said at least one transformer inducing a D.C. output voltage for a load connected to the secondary winding in response to the D.C. input voltage applied to the primary winding, said secondary winding having a winding resistance;

a detection circuit for sensing current flow in said secondary winding without the need for a separate current-sensing element, said detection circuit connected to one terminal of the secondary winding for detection of a voltage drop which is proportional to the load current and which is caused by the winding resistance of the secondary winding in association with operation of the switching elements, said detection circuit detecting the voltage drop from one terminal of the secondary winding to produce output current detection signals through a filter network non-magnetically coupled therewith for rejection of signals within a switching frequency region from the output voltage induced in the secondary winding;

a current sharing terminal connected to a transmitting line for carrying the output detection signals from the current detection circuit; and a pulse width control circuit for supplying the driving signals to said one or more switching elements to hold the D.C. output voltage constant, said pulse width control circuit controlling pulse widths of the driving signals supplied to the switching elements so that as an electric potential at the current sharing terminal increases more load current will be allowed to flow.

4. A switching power supply comprising:

at least one transformer having primary and secondary windings isolated from each other;

one or more switching elements for on-off control of D.C. input voltage applied to said primary winding;

said at least one transformer inducing a D.C. output voltage for a load connected to the secondary winding in response to the D.C. input voltage applied to the primary winding;

a choking coil coupled to the secondary winding and having a winding resistance; and a detection circuit for sensing current flow in said secondary winding without the need for a separate current-sensing element, said detection circuit connected to one terminal of the choking coil for detection of a voltage drop which is proportional to load current and which is caused by the winding resistance of the choking coil in association with operation of the switching elements, said detection circuit detecting the voltage drop from one terminal of the choking coil to produce output current detection signals.

5. A switching power supply according to claim 4, further comprising a pulse width control circuit for supplying driving signals to said one or more switching elements and keeping the D.C. output voltage constant, said pulse width control circuit forcedly narrowing pulse widths of the driving signals to limit the supply of load current when the output current detection signals reach at least a predetermined level.

6. A switching power supply according to claim 4, wherein said current detection circuit is coupled with a filter network for rejection of signals within a switching frequency region.

7. A switching power supply comprising:

at least one transformer having primary and secondary windings isolated from each other;

one or more switching elements for on-off control of D.C. input voltage applied to said primary winding;

said at least one transformer inducing a D.C. output voltage for a load connected to the secondary winding in response to the D.C. input voltage applied to the primary winding;

a choking coil interposed in a transmitting line of the D.C. output voltage and having a winding resistance;

a detection circuit for sensing current flow in said secondary winding without the need for a separate current-sending element, said detection circuit connected to one terminal of the choking coil for detection of a voltage drop which is proportional to load current, and which is caused by the winding resistance of the choking coil in association with operation of the switching elements, said detection circuits detecting the voltage drop from one terminal of the choking coil to produce output current detection signals a current sharing terminal connected to a second transmitting line carrying the output detection signals from the current detection circuit; and a pulse width control circuit for supplying driving signals to said one or more switching elements and keeping the D.C. output voltage constant, said pulse width control circuit controlling pulse widths of the driving signals so that as an electric potential at the current sharing terminal increases more load current will be allowed to flow.

8. A switching power supply according to claim 7, wherein said current detection circuit is coupled with a filter network for rejection of signals within a switching frequency region.

* * * * *